(12) United States Patent
Goyal

(10) Patent No.: US 7,523,153 B2
(45) Date of Patent: Apr. 21, 2009

(54) METHOD OF FORCING 1'S AND INVERTING SUM IN AN ADDER WITHOUT INCURRING TIMING DELAY

(75) Inventor: Ashutosh Goyal, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 841 days.

(21) Appl. No.: 11/057,330

(22) Filed: Feb. 11, 2005

(65) Prior Publication Data

US 2006/0184605 A1    Aug. 17, 2006

(51) Int. Cl.
*G06F 7/507* (2006.01)
(52) U.S. Cl. ...................................... 708/714
(58) Field of Classification Search ................ 708/714
See application file for complete search history.

(56) References Cited

U.S. PATENT DOCUMENTS

| | | | |
|---|---|---|---|
| 4,982,352 A | 1/1991 | Taylor et al. | |
| 5,189,636 A * | 2/1993 | Patti et al. | 708/706 |
| 6,301,600 B1 * | 10/2001 | Petro et al. | 708/670 |
| 2003/0005017 A1 * | 1/2003 | Bradley et al. | 708/700 |

* cited by examiner

*Primary Examiner*—David H Malzahn
(74) *Attorney, Agent, or Firm*—Diana R. Gerhardt; Jack V. Musgrove

(57) ABSTRACT

A summing circuit for an adder decodes control signals to determine that the result should be manipulated, and generates a half-sum output which is used to produce a manipulated result based on the control signals. The half-sum output is combined with a previous carry bit to complete the sum operation. The control signals can invert the adder result, or force the result to be all 1's. These functions can be effectuated in a 3-way multiplexer that combines the operand inputs and control signals. For inversion, two separate logic circuits produce true and complement half-sums in parallel, and the appropriate half-sum is selected for the half-sum output. For a result of all 1's, a force_1 control signal pulls the half-sum output node to electrical ground and the final output is manipulated by gating the carry signals with the force_1 signal. The two functions are implemented without introducing additional delay.

4 Claims, 4 Drawing Sheets

METHOD OF FORCING 1'S AND INVERTING SUM IN AN ADDER WITHOUT INCURRING TIMING DELAY

BACKGROUND OF THE INVENTION

1. Field of the Invention

The present invention generally relates to digital logic circuits, and more particularly to high-speed adders used in arithmetic logic units, such as execution units in a microprocessor or address generators of a computer system.

2. Description of the Related Art

Adder circuits are fundamental building blocks in all microprocessor designs. An adder, as suggested by its name, simply adds two binary numbers. Adders are used in a wide variety of arithmetic logic units such as execution units of a microprocessor, including fixed-point (or integer) units. Adders are used not only for addition operations, but also in multipliers which function by performing multiple add and shift operations. Adders are used in other areas of a conventional computer system besides the main processor, for example, in computing physical or logical addresses for memory fetch operations. Furthermore, adders are used in many other special-purpose digital systems, e.g., telecommunications systems, where a general-purpose computer would be superfluous.

Several types of adders are widely known, including ripple carry adders, carry lookahead adders and carry-save adders. Carry lookahead and carry-save adders are fast, but larger and consume much more power than ripple adders. They are based on the usage of a carry tree that produces carries into appropriate bit positions without back propagation. In order to obtain the valid sum bits as soon as possible, the sum bits are computed by means of carry-select blocks which are able to perform their operations in parallel with the carry-tree.

Carry lookahead schemes are common in the industry for the design of adder circuits that avoid the need to wait for a carry at the first stage to serially propagate to the most significant bit of the sum output. A typical 64-bit carry lookahead adder 10 is illustrated in FIG. 1, and includes carry lookahead (CLA) logic 12 and sum logic 14. Sum logic 14 is partitioned into 16 functional blocks that each receive a pair of sets of operands (four bits per block) and a carry-in bit. The operands to each block determine whether a carry-output is generated within the block, and whether the block is to propagate the carry-input value to the carry-output value. The collection 16 of all outputs from the blocks in sum logic 14 is the result of the addition operation.

Each sum logic block can compute both true and complement results as two separate operations in parallel, i.e., one for the case where the carry-in signal is "0" and one for the case where the carry-in signal is "1." One of these two results (true and complement) is then selected for output based on the real carry signal, once it has developed. This design is further shown in FIG. 2 which depicts the operation of one of the sum logic blocks 14a.

Block 14a includes first ripple carry logic 18 which computes a half-sum assuming that the carry bit is set to zero, and second ripple carry logic 20 which computes the half-sum assuming that the carry bit is set to one. Each of ripple carry logic 18 and 20 is implemented as a ripple adder and receives four bits from each operand, e.g., A(0:3) and B(0:3). Sum output completion logic 22 and 24 finishes the local sum operations to generate a carry-0 sum (S0) and a carry-1 sum (S1). Those values are passed to a 2:1 multiplexer 26 which is controlled by the true carry signal from CLA block 12a to output the appropriate sum bits to the result bus.

Although the design of FIG. 2 requires twice the complexity for the sum logic, it allows the true and complement sums to be generated in an overall faster manner, which is increasingly important as designers attempt to achieve ever-higher computation speeds. The speed of a carry-lookahead adder is generally bound by the speed of the carry-generation and propagation process. In the example of FIG. 2, the critical path for generating the final, correct sum bits includes the carry lookahead logic 12a and the multiplexer 26, i.e., this path has the longest delay of any circuit through the generate/integrate block.

A good adder design will try to balance the delays in the sum logic and in the CLA logic. If the sum logic is faster, it can be detuned to save power or area (by adjusting the types of CMOS devices or their sizes), because the overall delay is still determined by the CLA logic. In addition to achieving this balance, additional functions can be added to improve the cycles per instruction (CPI) of the machine as long as they do not cause a delay penalty over the usual addition time.

Since the CLA is the critical path of the adder, these functions can only be located in the sum logic. Traditionally, these functions are gated directly with the carry from the CLA chain, and the sum logic (if implemented as a ripple adder) can become slower than the CLA delay. For example, it is often desirable to invert the result of the adder, or force the output of the adder to all 1's. Two control signals can be provided for these features, a force_1 control signal and an invert control signal, and control logic 28 is inserted in the sum logic to implement this functionality. This control logic, however, introduces further delay to the sum path, and to keep the sum delay smaller than the CLA delay, it becomes necessary to use aggressive local CLA logic 30 within the sum logic to contain the delay. This approach can unduly increase the area and power of the adder design (a problem which is only exacerbated as the adder size grows), and can even lead to the sum logic being faster than the CLA delay when this is not desired.

In light of the foregoing, it would be desirable to devise an improved adder design which could allow for features such as inversion or forcing 1's without introducing a delay in the sum logic. It would be further advantageous if the design could still conserve area and power.

SUMMARY OF THE INVENTION

It is therefore one object of the present invention to provide such a design that allows for added functionality in the sum logic without introducing excessive delay or circuitry requiring large area and power.

It is another object of the present invention to provide a method of inverting a sum in an adder and forcing 1's without incurring a timing delay.

The foregoing objects are achieved in a method of operating an adder circuit, by decoding two or more control signals to determine that a result of the adder should be manipulated, and generating a half-sum output which is used to produce a manipulated result based on the decode of the control signals. The half-sum output is combined with a previous carry bit to complete the sum operation. In the illustrative embodiment, the control signals can selectively invert the adder result, or force the result to be all 1's. These functions can be effectuated in a 3-way multiplexer that combines the operand inputs and control signals. For the case in which the result is to be inverted, two separate logic circuits can produce true and complement half-sums in parallel, and the appropriate half-sum is then selected for the half-sum output. For the case in which the result of the adder to be all 1's, the control signal pulls the half-sum output node to electrical ground.

The above as well as additional objectives, features, and advantages of the present invention will become apparent in the following detailed written description.

BRIEF DESCRIPTION OF THE DRAWINGS

The present invention may be better understood, and its numerous objects, features, and advantages made apparent to those skilled in the art by referencing the accompanying drawings.

The use of the same reference symbols in different drawings indicates similar or identical items.

DESCRIPTION OF THE PREFERRED EMBODIMENT(S)

Figure 1:
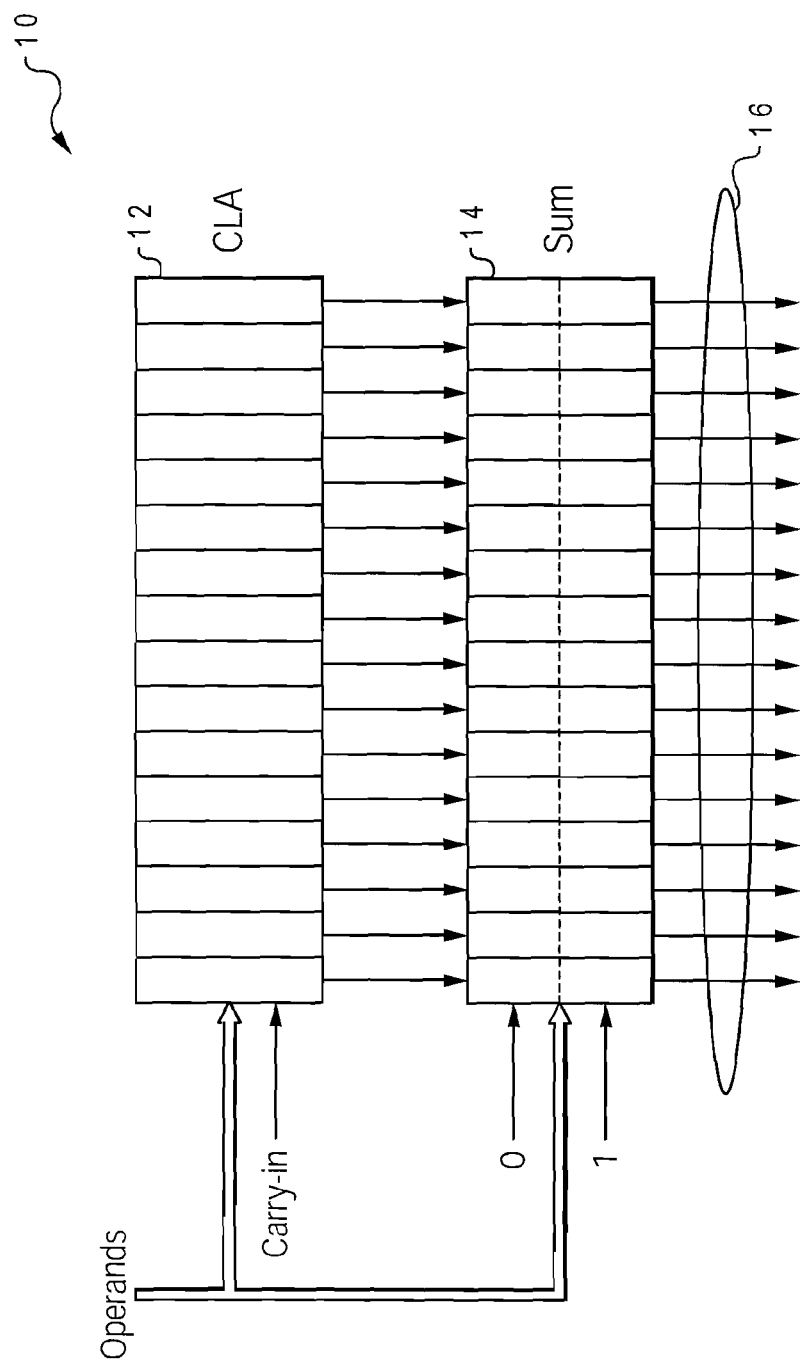
FIG. 1 is a high-level schematic diagram of a conventional 64-bit adder for an arithmetic logic unit, having sum logic divided into sixteen 4-bit blocks with sixteen corresponding carry lookahead (CLA) blocks.
Figure 2:
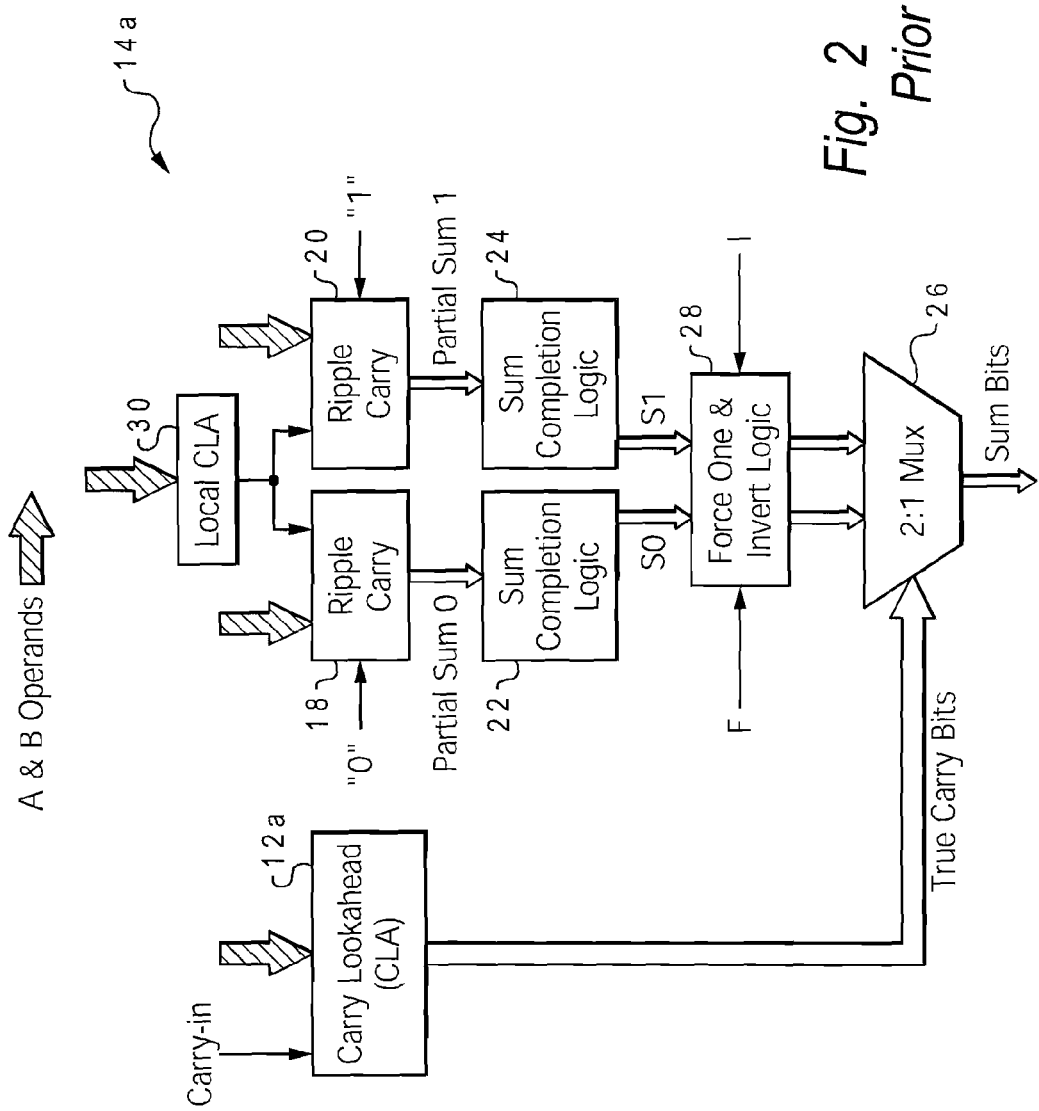
FIG. 2 is a block diagram of one of the sum logic blocks in the adder of FIG. 1 which performs two sum operations in parallel for the two possible carry inputs, wherein a force_1 control signal is used to force the sum logic to output all 1's, and an invert control signal is used to invert the computed sum.
Figure 3:
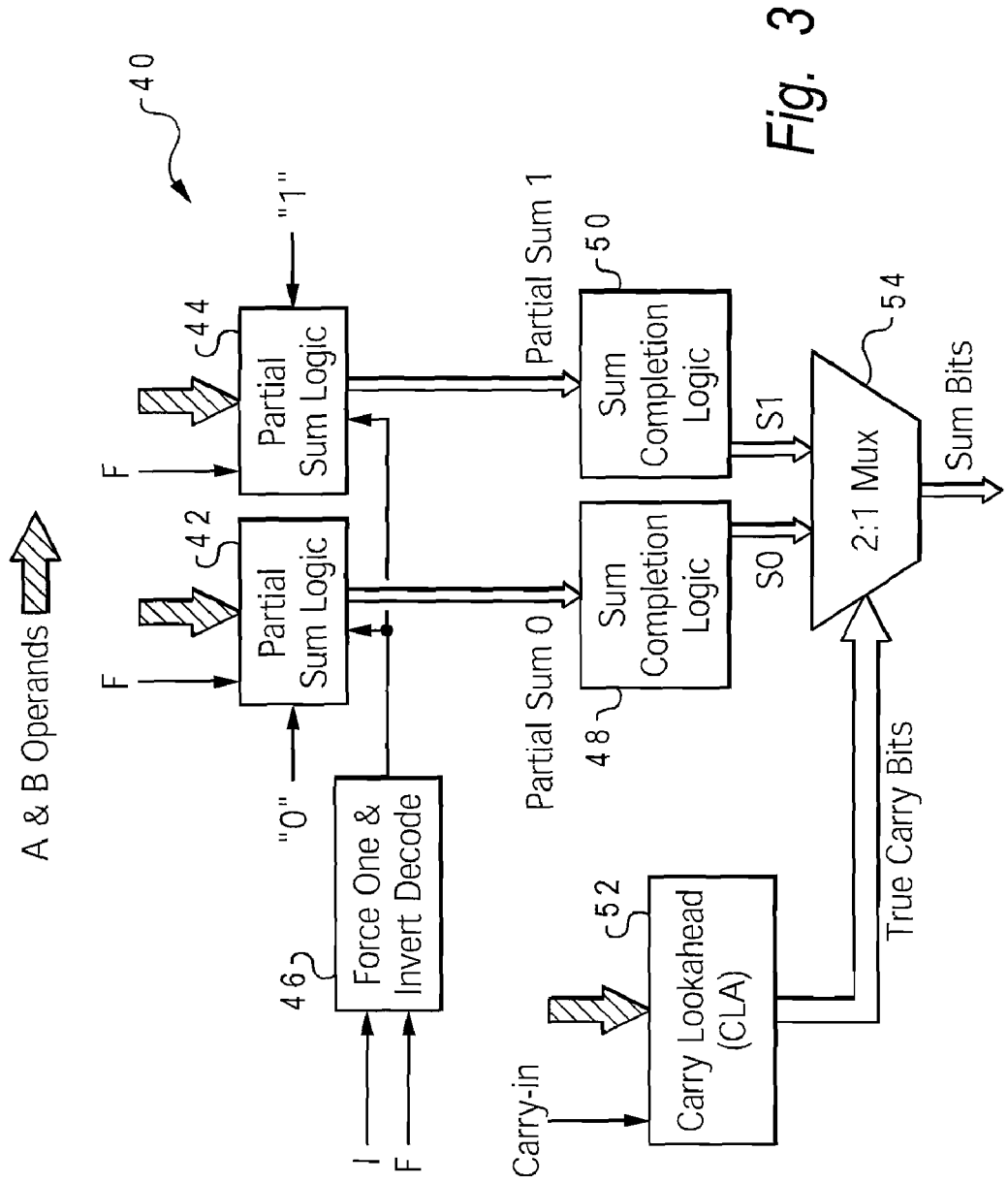
FIG. 3 is a block diagram of one embodiment of a sum logic block for an adder constructed in accordance with the present invention, wherein force_1 and invert control signals are applied to partial sum logic to allow manipulation of the sum without introducing any timing delay.

With reference now to the figures, and in particular with reference to FIG. 3, there is depicted one embodiment 40 of a summing circuit constructed in accordance with the present invention. Summing circuit 40 may comprise a 4-bit sum block that is part of a larger (e.g., 64-bit) adder. The adder so constructed may further be incorporated into a wide variety of digital logic circuits, such as execution units used by a microprocessor to operate the software programs running on a computer system (including floating-point units, fixed-point, branch units, etc.). Those skilled in the art will appreciate, however, that the use of adders is widespread throughout logic circuits and the present invention is not limited to use in execution units or general purpose data processing systems.

Summing circuit 40 is generally comprised of partial sum logic 42 and 44, force one and invert decode logic 46, sum completion logic 48 and 50, carry lookahead (CLA) block 52, and a 2:1 multiplexer 54. Operands A and B are provided as inputs to each of partial sum logic 42 and 44, and to CLA block 52. Partial sum logic 42 uses the operands to generate a partial sum, such as a half-sum, assuming that the carry signal for this operation will be a "0." Partial sum logic 44 uses the same operands to generate a partial sum, such as a half-sum, assuming that the carry signal for this operation will be a "1." The half-sums represent an intermediate result of the addition operation, without reference to the carry bits. The sum operations are completed by sum completion logic 48 and 50, which forward the results to multiplexer 54. Multiplexer 54 selects between the S0 and S1 results based on the actual carry bits from CLA block 52.

Force one and invert decode logic 46 receives a force_1 control signal (F) and an invert control signal (I) which are used to manipulate the sums computed by partial sum logic 42 and 44. The force_1 signal is also a direct input into partial sum logic 42 and 44. The force_1 control signal causes the output of the sum logic to be all 1's, while the invert control signal causes the result to be inverted at the output. If the invert and force_1 control signals are active at the same time (which should not happen in normal operation), the force_1 signal overrides the invert signal and the output will be all 1's.

The present invention recognizes that the force_1 and invert signals can be combined with the half-sum in a 3-way multiplexer and then combined with the carry to generate the correct sum without an aggressive 2-bit local CLA in the sum logic. In other words, the half-sums generated by partial sum logic 42 and 44 will be all 1's if the force_1 signal is active, and the half-sums will be inverted if the invert signal is active. This logic can be implemented as shown in Table 1 for the different combinations of force_1, invert and the half-sum.

TABLE 1

| Force_1 (F) | Invert (I) | Half-Sum (S) | Output (y) |
|---|---|---|---|
| 0 | 0 | 0 | 0 |
| 0 | 0 | 1 | 1 |
| 0 | 1 | 0 | 1 |
| 0 | 1 | 1 | 0 |
| 1 | 0 | 0 | 1 |
| 1 | 0 | 1 | 1 |
| 1 | 1 | 0 | 1 |
| 1 | 1 | 1 | 1 |

The simple k-map on this logic gives:

$$y=F+I'S+IS'=F+F'(I'S+IS')=F+F'I'S+F'IS'.$$

This logic equation can be implemented in many ways, but is effectively a 3-way mux with F having the highest priority and, if F is not active, I selects the true or complement of the half-sum. Since this selected half-sum still needs to be combined with the ripple carry to generate the full sum (with carry-in 0 and carry-in 1 in parallel), the F signal can be gated with the ripple carries of bits except in the most significant bit of the 4-bits (the "nibble"). This F-gating with carry delay in bits can be made non-critical by realizing that in three of the four bits, the worst case delay in the nibble is due to carry ripple in the nibble. The delay for the decode mux is designed with respect to the last ripple carry early enough to be completely non-critical.

Figure 4:
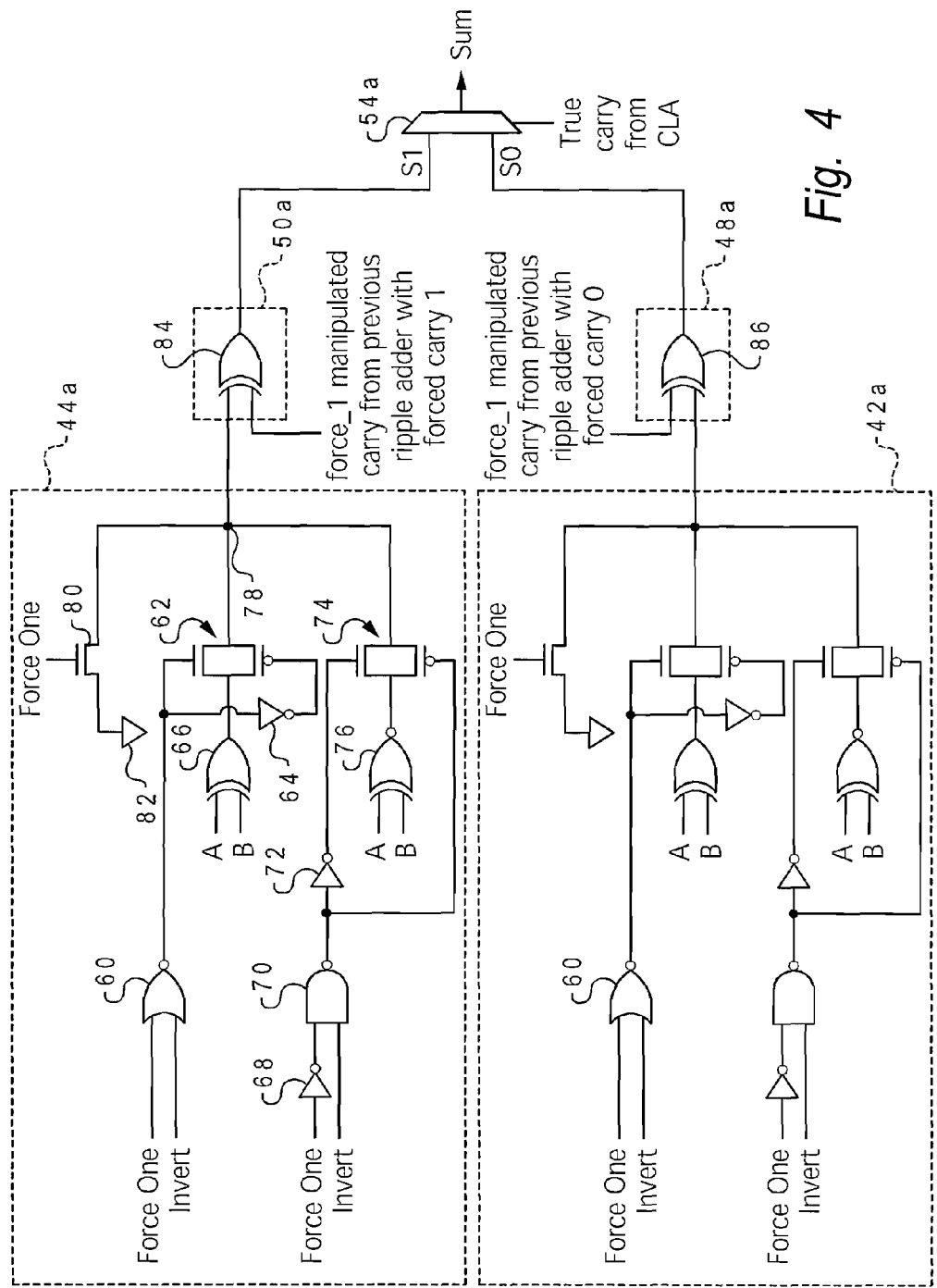
FIG. 4 is a schematic diagram of a one-bit, half-sum circuit that may be used in the sum logic block of FIG. 3, illustrating a method of incorporating the force_1 and invert control signals into half-sum logic in accordance with one implementation of the present invention.

FIG. 4 is a schematic diagram illustrating one way that this logic can be carried out. Those skilled in the art will appreciate that the circuitry of FIG. 4 represents only one of many possible implementations, and the invention is not limited to this embodiment. In this example, the four bits in a nibble are processed separately in 2-bit pairs, an "odd" pair (O) and an "even" pair (E). FIG. 4 illustrates the processing for one bit each for a carry-in of 0 and a carry-in of 1 in the odd pair of operand bits; the even pair of operand bits is processed analogously.

The sum logic includes two half-sum generators 42a and 44a whose outputs are respectively connected to two sum completion units 48a and 50a. The outputs of the sum completion units (S0 and S1) are input to a 2:1 multiplexer 54a. In half-sum generator 44a, the force_1 and invert signals are fed to a NOR gate 60 whose output is connected to a switch 62 formed by an n-type field effect transistor (NFET) and a p-type field effect transistor (PFET). The NFET gate of this switch is controlled by the output of NOR gate 60, and the PFET gate is controlled by an inverter 64 which flips the signal from NOR gate 60. The input to NFET/PFET switch 62 is the output of an XOR gate 66 whose inputs are the two operands A and B. The force_1 complement from inverter 68 and the invert signal are also fed to a NAND gate 70 whose output is connected to an inverter 72. The NFET gate of another NFET/PFET switch 74 is controlled by the output of inverter 72, and the PFET gate is controlled by the output of NAND gate 70. The input to NFET/PFET switch 74 is the output of an XNOR gate 76 whose inputs are the two operands A and B. This circuitry decodes the force_1 and invert signals before the partial sums are passed to the sum completion logic.

The outputs of switches 62 and 74 meet at node 78 which is also connected to the drain of an NFET 80 in a wire-ORed fashion. The source of NFET 80 is connected to electrical ground 82, and its gate is controlled by the force_1 signal. The half-sum output of gate 66 is the true half-sum, and the half-sum output of gate 76 is the complement half-sum. The decoded control signals select between the outputs of switches 62 and 74, so the half-sum at node 78 is the true half-sum if the invert signal is 0 or is the complement half-sum if the invert signal is 1, i.e., the inversion acts on the half-sum and not the completed sum. When the force_1 signal is active, node 78 is pulled to electrical ground. The signal from node 78 is combined with the carry bit from the previous ripple adder (with a forced carry of 1) in an XNOR gate 84 to complete the sum. The output of XNOR gate 84 is the complement result S1.

The circuitry for half-sum generator 42a is the same as that for half-sum generator 44a. The only difference between the S0 and S1 circuits (in this implementation) is the different carry inputs to XNOR gate 84 and XOR gate 86.

The present invention adds functionality to the adder in a way which improves the cycles per instruction (CPI) of the machine without adding any timing penalty, thereby improving the frequency of the design. In conventional designs, large drivers are needed to obtain the same functionality and maintain the CPI, so the present invention further saves on power consumption as well as chip area. Furthermore, the novel design disclosed herein lends itself to a faster implementation with appropriate modifications for the future.

Although the invention has been described with reference to specific embodiments, this description is not meant to be construed in a limiting sense. Various modifications of the disclosed embodiments, as well as alternative embodiments of the invention, will become apparent to persons skilled in the art upon reference to the description of the invention. For example, the invention has been discussed in the context of a carry lookahead adder which is one of the most common implementations for high frequency adder designs, but the invention is also applicable to other types of adders. It is therefore contemplated that such modifications can be made without departing from the spirit or scope of the present invention as defined in the appended claims.

What is claimed is:

1. A method of operating an adder circuit, comprising:
   decoding two or more control signals to determine that a result of the adder should be inverted; and
   generating at least one half-sum output which is used to produce a manipulated result based on the control signals, wherein said generating includes combining operand bits to produce true and complement half-sums in parallel and selecting the complement half-sum for the half sum output.

2. The method of claim 1, farther comprising combining the half-sum output with a previous carry bit to complete a sum operation.

3. A method of operating an adder circuit, comprising:
   decoding two or more control signals to determine that a result of the adder should be forced to all 1's; and
   generating at least one half-sum output which is used to produce a manipulated result based on the control signals, wherein said generating includes pulling a half sum output node to electrical ground.

4. The method of claim 3, farther comprising combining the half sum output with a previous carry bit to complete a sum operation.

\* \* \* \* \*